United States Patent
Doi et al.

(10) Patent No.: US 8,774,567 B2
(45) Date of Patent: Jul. 8, 2014

(54) POLARIZATION MULTIPLEXING MODULATOR

(75) Inventors: Masaharu Doi, Kawasaki (JP);
Kazuhiro Tanaka, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/599,720

(22) Filed: Aug. 30, 2012

(65) Prior Publication Data

US 2013/0010345 A1 Jan. 10, 2013

Related U.S. Application Data

(62) Division of application No. 12/585,958, filed on Sep. 29, 2009, now Pat. No. 8,280,200.

(30) Foreign Application Priority Data

Dec. 9, 2008 (JP) .................................. 2008-313622

(51) Int. Cl.

| G02B 6/00 | (2006.01) |
| G02B 6/10 | (2006.01) |
| G02B 6/02 | (2006.01) |
| G02B 6/24 | (2006.01) |
| G02B 6/27 | (2006.01) |
| G02B 1/00 | (2006.01) |
| G02F 2/00 | (2006.01) |
| G02F 1/01 | (2006.01) |

(52) U.S. Cl.
USPC .................... 385/2; 385/11; 385/40; 359/246

(58) Field of Classification Search
CPC .......... G02B 5/30; G02B 6/42; G02B 6/0056; G02B 6/3594; G02B 6/10; G02B 6/02; G02B 6/24; G02B 6/27; G02B 6/3536; G02B 6/357; G02B 6/3598; G02B 5/1828; G02F 1/00
USPC .................................... 385/2, 40, 11; 359/246
See application file for complete search history.

(56) References Cited

U.S. PATENT DOCUMENTS 3,955,202 A * 5/1976 Young ............................ 343/756
4,153,328 A * 5/1979 Wang .............................. 385/28

(Continued)

FOREIGN PATENT DOCUMENTS

| JP | 58-014122 | 1/1983 |
| JP | 6-160654 | 6/1994 |

(Continued)

OTHER PUBLICATIONS

Patent Abstracts of Japan, Publication No. 10-003066, Published Jan. 6, 1998.

(Continued)

*Primary Examiner* — Kaveh Kianni
(74) *Attorney, Agent, or Firm* — Staas & Halsey LLP

(57) ABSTRACT

A polarization conversion device converts a polarization state of a light which is input to a first waveguide, that is, TE/TM mode of the light, to output it from the first waveguide. The polarization conversion device includes: a mode converter that performs the inter-conversion of TE/TM modes of the light which is input to the first waveguide; and a polarization separator that receives the light passed through the mode converter and separates the received light into a first light, TE/TM of which mode has been converted by the mode converter and a second light, TE/TM of which mode has not been converted, to output the first light to the first waveguide.

2 Claims, 6 Drawing Sheets

(56) References Cited

U.S. PATENT DOCUMENTS

| | | | |
|---|---|---|---|
| 5,351,317 A | 9/1994 | Weber | |
| 5,581,345 A * | 12/1996 | Oki et al. | 356/4.01 |
| 5,611,004 A * | 3/1997 | Chang et al. | 385/11 |
| 5,617,435 A * | 4/1997 | Nagai et al. | 372/22 |
| 5,963,034 A * | 10/1999 | Mahapatra et al. | 324/244.1 |
| 6,112,000 A * | 8/2000 | Bergmann et al. | 385/47 |
| 6,243,516 B1 | 6/2001 | Seino | 385/47 |
| 6,278,813 B1 * | 8/2001 | Takada et al. | 385/24 |
| 6,477,287 B1 * | 11/2002 | Hait | 385/15 |
| 6,538,787 B1 * | 3/2003 | Moeller et al. | 398/158 |
| 6,546,161 B2 * | 4/2003 | Okuno et al. | 385/14 |
| 6,560,387 B1 * | 5/2003 | Hehlen et al. | 385/39 |
| 6,580,842 B1 * | 6/2003 | Hehlen et al. | 385/11 |
| 6,600,582 B1 * | 7/2003 | Liu et al. | 398/79 |
| 6,862,130 B2 | 3/2005 | Batchko et al. | |
| 6,907,169 B2 * | 6/2005 | Vahala et al. | 385/50 |
| 6,947,639 B2 * | 9/2005 | Singh et al. | 385/37 |
| 7,068,864 B2 * | 6/2006 | Hanashima et al. | 385/6 |
| 7,127,131 B2 * | 10/2006 | Watts | 385/11 |
| 7,221,826 B2 * | 5/2007 | Hanashima et al. | 385/43 |
| 7,228,015 B2 * | 6/2007 | Watts et al. | 385/11 |
| 7,236,668 B2 * | 6/2007 | Hanashima et al. | 385/43 |
| 7,245,793 B2 * | 7/2007 | Kamei et al. | 385/14 |
| 7,263,247 B1 * | 8/2007 | Hehlen et al. | 385/14 |
| 7,359,051 B2 | 4/2008 | Shibata | |
| 7,826,689 B2 * | 11/2010 | Sugiyama | 385/2 |
| 2001/0009595 A1 * | 7/2001 | Okuno et al. | 385/14 |
| 2001/0046363 A1 * | 11/2001 | Purchase et al. | 385/140 |
| 2002/0154844 A1 * | 10/2002 | Shekel et al. | 385/8 |
| 2002/0179912 A1 | 12/2002 | Batchko et al. | |
| 2003/0012501 A1 * | 1/2003 | Nakajima et al. | 385/37 |
| 2004/0005056 A1 * | 1/2004 | Nishioka et al. | 380/256 |
| 2004/0126052 A1 * | 7/2004 | Kamei et al. | 385/14 |
| 2005/0254128 A1 * | 11/2005 | Watts | 359/558 |
| 2005/0265403 A1 * | 12/2005 | Anderson et al. | 372/20 |
| 2006/0018584 A1 * | 1/2006 | Watts et al. | 385/11 |
| 2007/0253659 A1 * | 11/2007 | Toyoda et al. | 385/3 |
| 2008/0031565 A1 * | 2/2008 | Little | 385/11 |
| 2008/0147759 A1 * | 6/2008 | Fiorentino et al. | 708/250 |
| 2008/0219675 A1 | 9/2008 | Yano | |
| 2009/0238512 A1 * | 9/2009 | Sugiyama | 385/2 |
| 2010/0142879 A1 * | 6/2010 | Doi et al. | 385/2 |
| 2010/0202724 A1 * | 8/2010 | Little et al. | 385/5 |

FOREIGN PATENT DOCUMENTS

| | | |
|---|---|---|
| JP | 07-325276 | 12/1995 |
| JP | 10-003066 | 1/1998 |
| JP | 2007-163780 | 6/2007 |
| JP | 2008-216824 | 9/2008 |

OTHER PUBLICATIONS

Office Action mailed Aug. 22, 2011 in co-pending U.S. Appl. No. 12/585,958.

Non-Final Office Action mailed Dec. 7, 2011 in co-pending U.S. Appl. No. 12/585,958.

Notice of Allowance mailed Jun. 7, 2012 in co-pending U.S. Appl. No. 12/585,958.

Espacenet Bibliographic Data, Japanese Publication No. 58-014122, published Jan. 26, 1983.

Espacenet Bibliographic Data, Japanese Publication No. 07-325276, Dec. 12, 1995.

Japanese Office Action issued Oct. 23, 2012 in corresponding Japanese Patent Application No. 2008-313622.

* cited by examiner

POLARIZATION MULTIPLEXING MODULATOR

CROSS-REFERENCE TO RELATED APPLICATION

This application is a Divisional of Application Ser. No. 12/585,958 filed Sep. 29, 2009, now U.S. Pat. No. 8,280,200, and is based upon and claims the benefit of priority from the prior Japanese Patent Application No. 2008-313622 filed on Dec. 9, 2008, the entire disclosures of which are hereby incorporated by reference.

FIELD

The embodiment discussed herein is related to a polarization conversion device and a polarization multiplexing modulator, to be used for optical communication or the like.

BACKGROUND

A polarization conversion device is an optical device which converts a polarization state of an input light into a different polarization state to output the converted light, for example, for when an input light of TM mode is converted into a light of TE mode to be output. In the case where such a polarization conversion device is made to be a reflective type in which an input section and an output section are common, it may be considered to configure this polarization conversion device using a ¼ wave plate and a reflective mirror, as illustrated in FIG. 9 of Japanese Laid-open Patent Publication No. 2007-163780. In this reflective type polarization conversion device, the light of TM mode (or TE mode) input from the input section passes through the ¼ wave plate, and thereafter, is reflected by the reflective mirror to again pass through the ¼ wave plate, so that the light of TM mode (or TE mode) is converted into the light of TE mode (or TM mode), to be output from the input section.

However, in the polarization conversion device of the above-mentioned configuration, there is a problem in that, when there is generated a component which has not been polarization-converted due to deviation in a setting angle of the ¼ wave plate and in thickness thereof, wavelength dependence thereof, a temperature state thereof or the like, the light containing the component which has not been polarization-converted and a component which has been polarization-converted is output, and therefore, a polarization extinction ratio of the output light is degraded.

SUMMARY

According to one aspect of the present invention, a polarization conversion device is configured to convert a polarization state of a light input to a first waveguide to output the converted light from the first waveguide, the polarization conversion device includes: a mode converter which performs an inter-conversion of TE/TM modes of the light input to the first waveguide; and a polarization separator which receives the light passed through the mode converter, and separates the received light into a first light, TE/TM mode of which has been converted by the mode converter, and a second light, TE/TM mode of which has not been converted by the mode converter, to output the first light to the first waveguide.

According to another aspect of the present invention, a polarization multiplexing modulator includes: a substrate having an electro-optic effect; a first optical modulator and a second optical modulator which are formed on the substrate and which modulate respective lights of same polarization state; a polarization converter which converts a polarization state of an output light from the second optical modulator; and a polarization combiner that polarization combines an output light from the first optical modulator and an output light from the polarization converter, to output a polarization multiplexed light, in which the polarization converter includes: a mode converter which performs the inter-conversion of TE/TM modes of the output light from the second optical modulator; and a polarization separator which receives a light passed through the mode converter and separates the received light into a first light, TE/TM mode of which has been converted by the mode converter, and a second light, TE/TM mode of which has not been converted by the mode converter, to output the first light to the polarization combiner.

The objects and advantages of the invention will be realized and attained by means of the elements and combinations particularly pointed out in the claims.

It is to be understood that both the foregoing general description and the following detailed description are exemplary and explanatory only and are not restrictive of the invention, as claimed.

DESCRIPTION OF EMBODIMENTS

Embodiments of the present invention will be explained with reference to accompanying drawings.

Figure 1:
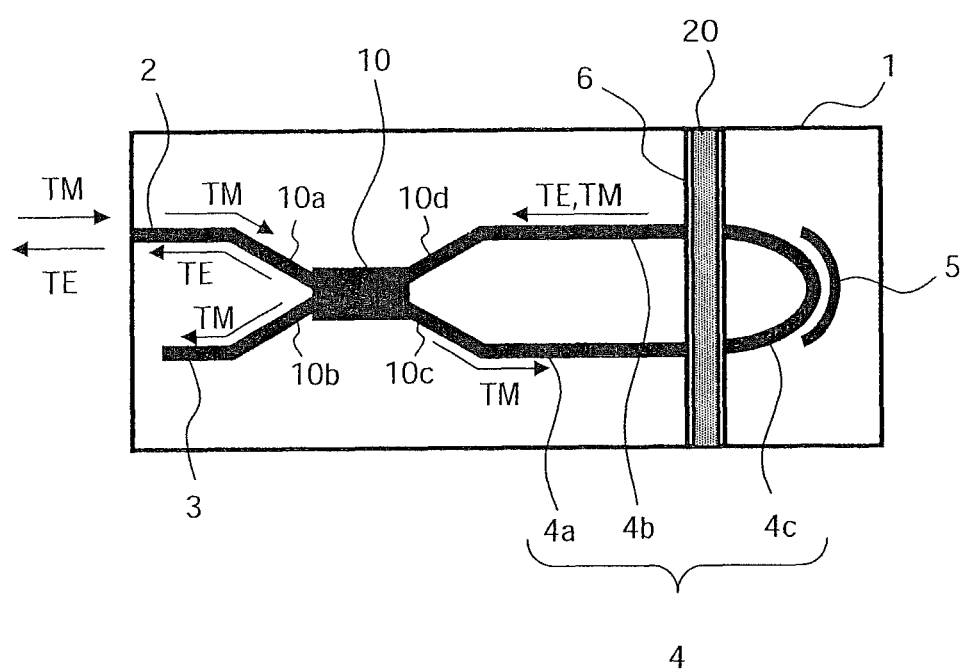
FIG. 1 is a view illustrating a schematic configuration of a polarization conversion device according to a first embodiment of the present invention.

FIG. 1 illustrates a schematic configuration of a polarization conversion device according to a first embodiment of the present invention. This polarization conversion device is configured as a so-called reflective type polarization conversion device which converts a light of TE mode (TM mode) input to an input waveguide from outside into a light of TM mode (TE mode), to output the converted light from the input waveguide.

As illustrated in FIG. 1, the polarization conversion device according to the first embodiment includes: a substrate 1; a polarization beam splitter 10 disposed on the substrate 1; and a ¼ wave plate 20.

The substrate 1 is a LN substrate formed of lithium niobate ($LiNbO_3$: LN) for example. Further, it is also possible to use a LT substrate formed of lithium tantalate ($LiTaO_3$: LT) in place of the LN substrate. On the substrate 1, a waveguide is formed by forming a metal film, such as titanium (Ti) or the like, on a surface thereof to thermally diffuse the metal film, or by patterning a thin metal film on the surface thereof, and thereafter, proton-exchanging the thin metal film in benzoic acid.

The polarization beam splitter 10 is capable of separating an input light into a light of TE mode and a light of TM mode to output the separated lights, and includes four input/output ports of first port 10a to fourth port 10d. In the present embodiment, when the light of TM mode is input form the first port 10a, the polarization beam splitter 10 outputs the light of TM mode as it is from the third port 10c. On the other hand, when the light containing the light of TE mode and the light of TM mode is input from the fourth port 10d, the polarization beam splitter 10 outputs the light of TE mode from the first port 10a, while outputting the light of TM mode from the second port 10b. Further, the first port 10a of the polarization beam splitter 10 is connected to a first waveguide 2 formed on the substrate 1, and the second port 10b thereof is connected to a second waveguide 3 formed on the substrate 1 to be approximately in parallel with the first waveguide.

Here, the first waveguide 2 functions as an input waveguide and an output waveguide of the polarization conversion device according to the present embodiment. Namely, when the light of TM mode is input to the first waveguide from outside, the polarization conversion device according to the present embodiment converts the input TM mode light into the light of TE mode to output the converted TE mode light to outside from the first waveguide.

Furthermore, the third port 10c of the polarization beam splitter 10 and the fourth port 10d thereof are connected to each other by a connection waveguide 4 formed on the substrate 1. The connection waveguide 4 includes: a first linear waveguide 4a connected to the third port 10c of the polarization beam splitter 10; a second linear waveguide 4b connected to the fourth port 10d of the polarization beam splitter 10; and a curved waveguide 4c which is formed in an arc shape for turning back an optical propagation direction to connect the first linear waveguide 4a and the second linear waveguide 4b.

On the substrate 1, an arc-shaped groove 5 is formed along an outer peripheral side of the curved waveguide 4c, and an optical confinement effect into the curved waveguide 4c is improved by means of this arc-shaped groove 5, so that a loss of light propagated through the connection waveguide 4 is suppressed. However, such an arc-shaped groove 5 is not indispensable, and may be disposed if required.

The ¼ wave plate 20 is inserted in a groove 6 formed for cutting off the first and second linear waveguides 4a and 4b which configure the connection waveguide 4, to be fixed therein with the adhesive for example. Here, the connection waveguide 4 may be configured only by the curved waveguide 4c. In this case, the ¼ wave plate 20 is inserted in a groove formed for cutting off two sites of the curved waveguide 4c, to be fixed therein. Further, two grooves for cutting off the connection waveguide 4 may be formed, and the ¼ wave plates 20 may be inserted in the two grooves to be fixed therein. However, as illustrated in FIG. 1, the single ¼ wave plate 20 is inserted in the single groove 6 which cuts off the first and second linear waveguides 4a and 4b, so that a labor for forming the groove 6, a labor for adjusting a setting angle of the ¼ wave plate 20 and the like, can be reduced, and also, a portion other than necessity of the connection waveguide 4 can be prevented from being damaged, thereby improving the productivity of the polarization conversion device.

Next, there will be explained a function of the polarization conversion device according to the first embodiment.

Firstly, as illustrated in FIG. 1, the light of TM mode is input from outside to the first waveguide 2 formed on the substrate 1. Then, the input light of TM mode is further input to the first port 10a of the polarization beam splitter 10, to be output as it is to the connection waveguide 4 from the third port 10c. The light of TM mode output to the connection waveguide 4 passes through the ¼ wave plate 20 twice while being propagated through the connection waveguide 4, so that a polarization plane thereof is rotated by 90°, and consequently, the light of TM mode is converted into the light of TE mode to be input to the fourth port 10d of the polarization beam splitter 10.

Here, there may be generated a component which is not polarization-converted (namely, is not mode-converted), in the light of TM mode being propagated through the connection waveguide 4, due to deviation in the setting angle of the ¼ wave plate 20, a characteristic change thereof caused by a temperature change or the like. In this case, as illustrated in FIG. 1, the light containing the light of TE mode and the light of TM mode is input to the fourth port 10d of the polarization beam splitter 10.

As described above, when the light containing the light of TE mode and the light of TM mode is input from the fourth port 10d, the polarization beam splitter 10 outputs the light of TE mode from the first port 10a, while outputting the light of TM mode from the second port 10b. Namely, the polarization beam splitter 10 receives the light which has passed through the ¼ wave plate 20 twice while being propagated through the connection waveguide 4, to separate the received light into the light which has been mode-converted light (that is, the light of TE mode) and the light which has not been mode-converted (that is, the light of TM mode). Then, the polarization beam splitter 10 outputs the light which has been mode-converted (the light of TE mode) from the first port 10a to lead it to the first waveguide 2, while outputting the light which has not been mode-converted (the light of TM mode) from the second port 10b, to diffuse it in the substrate 1 via the second waveguide 3. As a result, the light converted into TE mode is returned to the first waveguide 2 to which the light of TM mode has been input. Further, since the light of TM mode diffused in the substrate 1 via the second waveguide 3 is not substantially coupled to the first waveguide 2, the light of TE mode is output from the polarization conversion device.

Thus, in the polarization conversion device according to the present embodiment, the light of TM mode input from the first waveguide 2 passes through the ¼ wave plate twice to be converted into the light of TE mode, and further, passes through the polarization beam splitter 10, so that only the light of TE mode is substantially output from the first waveguide 2. Therefore, even if there is generated the component which has not been mode-converted due to the deviation in the setting angle of the ¼ wave plate 20 or the like, the component which has not been mode-converted is suppressed from being output from the first waveguide 2, and consequently, it is possible to suppress degradation in a polarization extinction ratio of output light from the polarization conversion device configured in reflective type.

Figure 2:
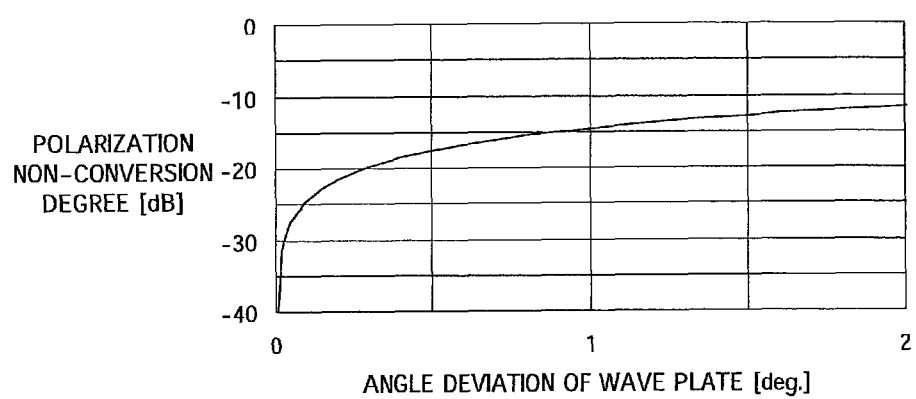
FIG. 2 is a view illustrating one example of relation between angle deviation of ¼ wave plate and a polarization non-conversion degree thereof, in the polarization conversion device according to the first embodiment.

As illustrated in FIG. 2 for example, when the setting angle of the ¼ wave plate 20 is deviated by 1°, a degree of non-polarization conversion becomes about −15 dB, so that the component which is not mode-converted is increased. If the light in such a state returns to the first waveguide 2 to be output, the polarization extinction ratio of the output light is degraded.

In this regard, in the polarization conversion device according to the present embodiment, even if there is generated the component which has not been mode-converted in the light being propagated through the waveguide, the light is separated into the light of TE mode and the light of TM mode by the polarization beam splitter 10, so that the light of TE mode is output from the first waveguide 2. Accordingly, even though the setting angle of the ¼ wave plate 20 is deviated by 1°, if a polarization extinction ratio of the polarization beam splitter 10 is set at 20 dB, the polarization extinction ratio of the output light can be made to be about 35 dB.

In the present embodiment, the connection waveguide 4 and the ¼ wave plate 20 correspond to "a mode convertor" in the present invention, the polarization beam splitter 10 corresponds to "a polarization separator" therein, and the ¼ wave plate 20 corresponds to "a mode conversion element" therein.

Figure 3:
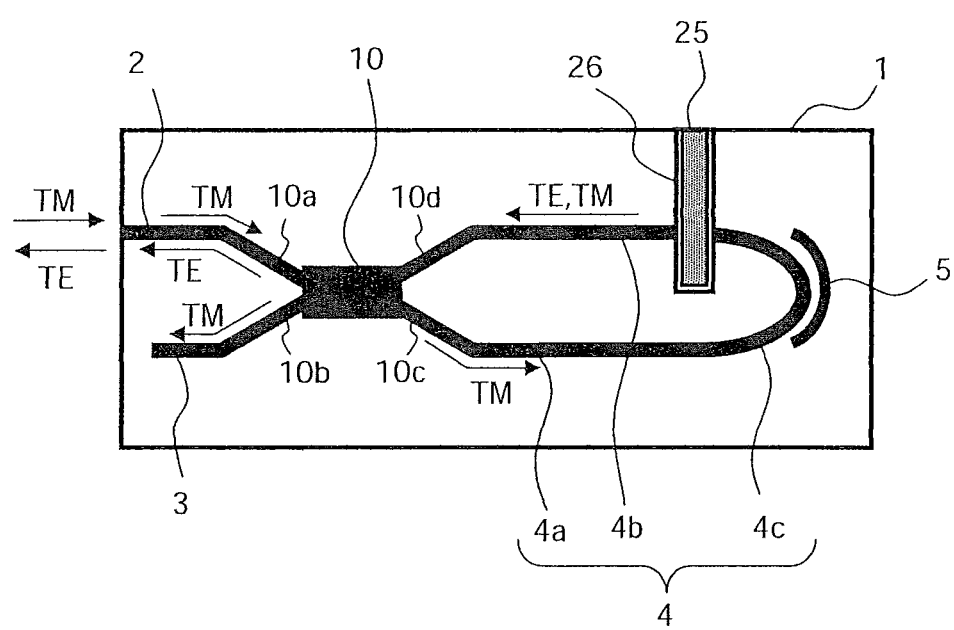
FIG. 3 is a view illustrating a schematic configuration of a polarization conversion device according to a second embodiment of the present invention.

FIG. 3 illustrates a schematic configuration of a polarization conversion device according to a second embodiment of the present invention.

As illustrated in FIG. 3, in the polarization conversion device according to the second embodiment, a ½ wave plate 25 is used in place of the ¼ wave plate 20. Namely, in the polarization conversion device according to the first embodiment, the light passes through the ¼ wave plate 20 twice, so that TE/TM mode thereof is converted. Contrary to the above, in the polarization conversion device according to the second embodiment, the light passes through the ½ wave plate once, so that TE/TM mode thereof is converted. Further, in the polarization conversion device according to the second embodiment, the ½ wave plate 25 is inserted in a groove 26 which cuts off the connection waveguide 4 at only one site, to be fixed therein with the adhesive or the like. Other configurations of the polarization conversion device according to the second embodiment are same as those of the polarization conversion device according to the first embodiment, and therefore, the explanation thereof is omitted here.

Next there will be explained a function of the polarization conversion device according to the second embodiment.

Similarly to the polarization conversion device according to the first embodiment, in the polarization conversion device according to the second embodiment, the light of TM mode is input to the first waveguide 2 formed on the substrate 1. This input light of TM mode is further input to the first port 10*a* of the polarization beam splitter 10, to be output as it is from the third port 10*c* to the connection waveguide 4. The light of TM mode output to the connection waveguide 4 passes through the ½ wave plate 25, so that the polarization plane thereof is rotated by 90°, and accordingly, the light of TM mode is converted into the light of TE mode to be input to the fourth port 10*d* of the polarization beam splitter 10. Here, even if a part of the light being propagated through the connection waveguide 4 is not mode-converted, and consequently, the light containing the light of TE mode and the light of TM mode is input to the fourth port 10*d* of the polarization beam splitter 10, the polarization beam splitter 10 separates this light into the light of TE mode and the light of TM mode, and outputs the light of TE mode from the first port 10*a* to lead it to the first waveguide 2, while outputting the light of TM mode from the second port 10*b* to diffuse it in the substrate 1 via the second waveguide 3.

As a result, even if there is generated a component which has not been mode-converted due to deviation in a setting angle of the ½ wave plate 25, a characteristic change thereof caused by a temperature change or the like, such a component which has not been mode-converted is suppressed from returning to the first waveguide 2 to be output. Therefore, similarly to the polarization conversion device according to the first embodiment, it is possible to suppress the degradation in the polarization extinction ratio of the output light (the polarization conversion device). Further, since the connection waveguide 4 is cut off at only one site, it is possible to further reduce the loss of the light being propagated through the connection waveguide 4, in comparison with the polarization conversion device according to the first embodiment.

In the present embodiment, the connection waveguide 4 and the ½ wave plate 25 correspond to "the mode convertor" in the present invention, the polarization beam splitter 10 corresponds to "the polarization separator" therein, and the ½ wave plate 25 corresponds to "the mode conversion element" therein.

Here, in each polarization conversion device according to the first and second embodiment, the connection waveguide 4 formed on the substrate 1 is used as the configuration (turning-back configuration) for connecting the third port 10*c* and fourth port 10*d* of the polarization beam splitter 10. However, the present invention is not limited to the above-mentioned configuration, and in place of the connection waveguide 4, the third port 10*c* and the fourth port 10*d* may be connected by means of an optical fiber. In this case, the ¼ wave plates 20 can be attached on both end faces of the optical fiber or the ½ wave plate 25 can be attached on one of the end faces of the optical fiber.

Figure 4:
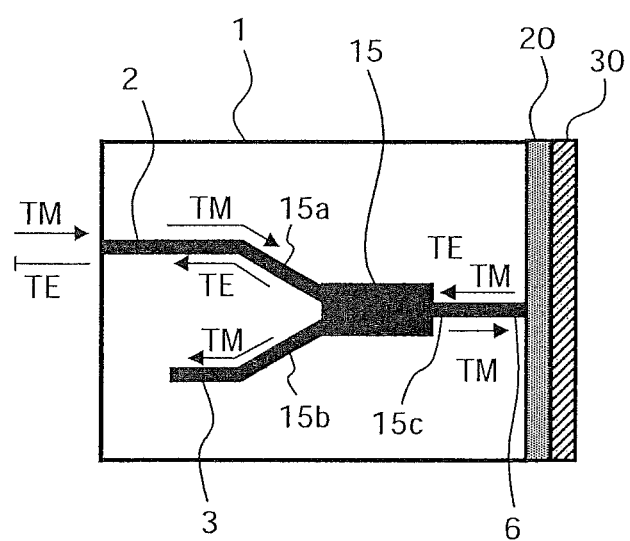
FIG. 4 is a view illustrating schematic configuration of a polarization conversion device according to a third embodiment of the present invention.

FIG. 4 illustrates a schematic configuration of a polarization conversion device according to a third embodiment of the present invention.

As illustrated in FIG. 4, the polarization conversion device according to the third embodiment includes: the substrate 1; a waveguide type polarization beam splitter 15 disposed on the substrate 1; the ¼ wave plate 20; and a reflective mirror 30.

The polarization beam splitter 15 is capable of separating the input light into the light of TE mode and the light of TM mode to output the separated lights, and includes three input/output ports of first port 15*a* to third port 15*c*. In the present embodiment, when the light of TM mode is input from the first port 15*a*, the polarization beam splitter 15 outputs the light of TM mode as it is from the third port 15*c*. On the other hand, when the light containing the light of TE mode and the light of TM mode is input from the third port 15*c*, the polarization beam splitter 15 outputs the light of TE mode from the first port 15*a*, while outputting the light of TM mode from the second port 15*b*. Further, the first port 15*a* of the polarization beam splitter 15 is connected to the first waveguide 2 formed on the substrate 1, and the second port 15*b* thereof is connected to the second waveguide 3 formed on the substrate 1 in approximately parallel with the first waveguide 2, and further, the third port 15*c* thereof is connected to a third waveguide 6 formed on the substrate 1. Here, similarly to each polarization conversion device according to the first and second embodiments, the first waveguide 2 functions as the input waveguide and output waveguide of the polarization conversion device according to the present embodiment.

The third waveguide 6 extends up to an end face of the substrate 1 on the opposite side of the first and second waveguides 2 and 3 with the polarization beam splitter 15 therebetween, and to the end face of the substrate 1 (that is, an end face of the third waveguide 6), the ¼ wave plate 20 and the reflective mirror 30 are fixed, in this sequence. However, the present invention is not limited thereto, and the configuration may be such that the light being propagated through the third waveguide 6 passes through the ¼ wave plate 20, and thereafter, is reflected by the reflective mirror 30 to again pass through the ¼ wave plate 20. For example, the ¼ wave plate 20 and the reflective mirror 30 may be inserted in a groove formed halfway in the third waveguide 6, or the ¼ wave plate 20 may be inserted in a groove formed halfway in the third waveguide 6 and the reflective mirror 30 may be attached on the end face of the substrate 1 (the third waveguide 6). Furthermore, as illustrated in a modified example of FIG. 5, the configuration may be such that the third waveguide 6 is omitted, and the third port 15c of the polarization beam splitter 15 is exposed to the end face of the substrate 1.

Next, there will be explained a function of the polarization conversion device according to the third embodiment.

Similarly to each polarization conversion device according to the first and second embodiments, the light of TM mode is input to the first waveguide 2 formed on the substrate 1. This input light of TM mode is further input to the first port 15a of the polarization beam splitter 15 to be output as it is from the third port 15c. The light of TM mode output from the third port 15c to the third waveguide 6 passes through the ¼ wave plate 20, and thereafter, is reflected by the reflective mirror 30 to again pass through the ¼ wave plate 20. As a result, since the light of TM mode passes through the ¼ wave plate twice, the polarization plane thereof is rotated by 90°, so that the light of TM mode is converted into the light of TE mode to be returned to the third port 15c of the polarization beam splitter 15.

Here, there may be generated a component which has not been mode-converted due to the deviation in the setting angle of the ¼ wave plate 20 or of the reflective mirror 30, or the characteristic change of the ¼ wave plate 20 caused by the temperature change. In this case, although the light containing the light of TE mode and the light of TM mode is input (returned) to the third port 15c of the polarization beam splitter 15, this input (returned) light is separated into the light of TE mode and the light of TM mode by the polarization beam splitter 15, and then, the light of TE mode is output from the first port 15a to be led to the first waveguide 2, whereas the light of TM mode is output from the second port 15b to be diffused in the substrate 1 via the second waveguide 3.

Thus, also in the polarization conversion device according to the present embodiment, similarly to each polarization conversion device according to the first and second embodiment, since the component which has not been mode-converted is suppressed from being output from the first waveguide 2, it is possible to suppress the degradation in the polarization extinction ratio of the output light. Further, by attaching the ¼ wave plate 20 and the reflective mirror 30 on the end face of the substrate 1, it is unnecessary to form a groove for cutting off the waveguide, and therefore, it is possible to prevent the loss of light due to such a groove.

In each polarization conversion device according to the first to third embodiments, the light of TM mode is input, and the input light of TM mode is converted into the light of TE mode to be output. Further, the configuration may be such that the light of TE mode is input, and the input light of TE mode is converted into the light of TM mode to be output. In this case, the description of the above-mentioned embodiment may be interpreted by reversing the light of TM mode with the light of TE mode.

Figure 6:
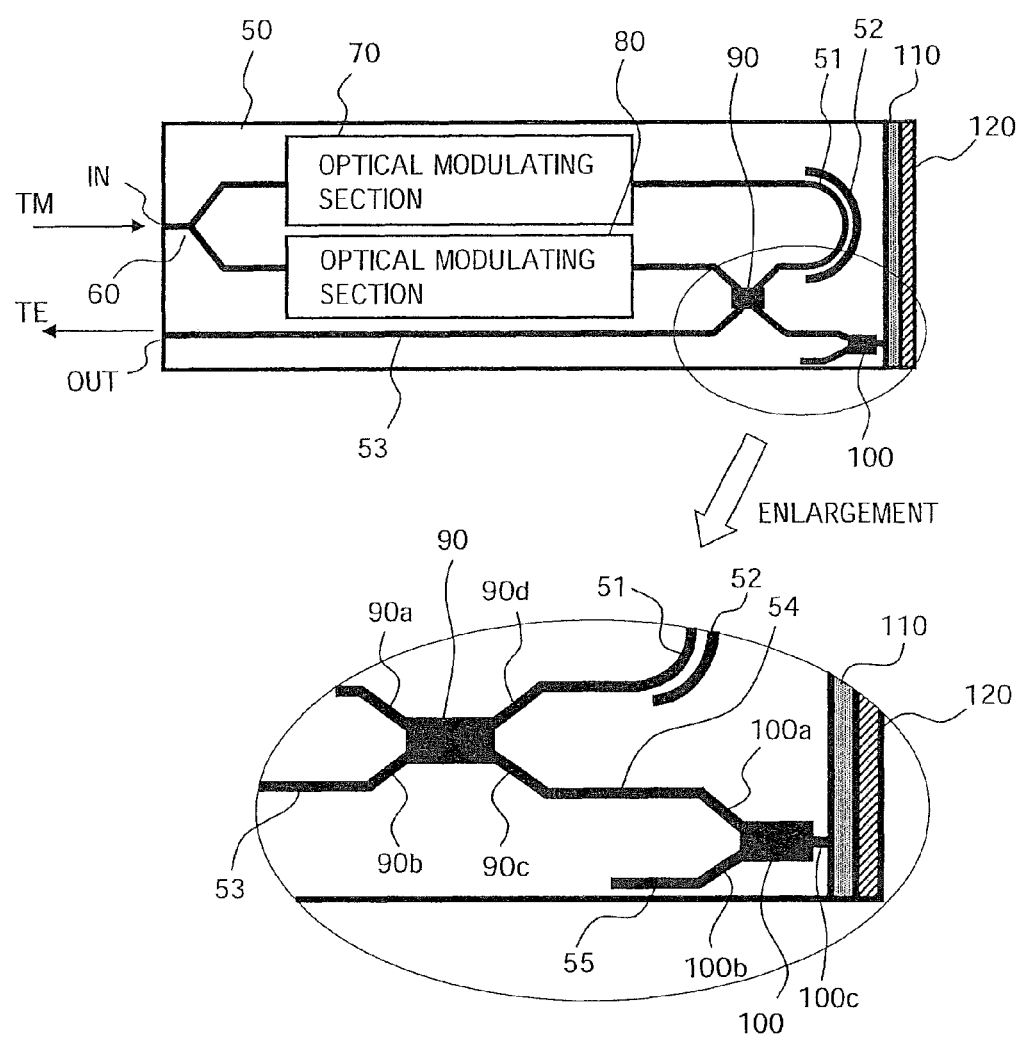
FIG. 6 is a view illustrating a schematic configuration of a polarization multiplexing modulator to which the present invention is applied.

FIG. 6 illustrates a schematic configuration of a polarization multiplexing modulator to which the present invention is applied.

This polarization multiplexing modulator modulates lights in same polarization state (TE mode or TM mode) which is input through an input section IN by two optical modulators; converts the polarization state of an output light from one of the optical modulators, to polarization combine the output light from the one optical modulator and an output light from the other optical modulator; and generates a polarization multiplexed light to output it from an output section OUT. Here, as a configuration for converting the polarization state of the output light from the one optical modulator, each polarization conversion device according to the first to third embodiments can be utilized.

As illustrated in FIG. 6, the polarization multiplexing modulator according to the present embodiment includes: a substrate 50 having a photo-electric effect; a demultiplexer 60 formed on the substrate 50; a first optical modulator 70 and a second optical modulator 80, which are formed on the substrate 50; a first polarization beam splitter 90 formed on the substrate 50; a second polarization beam splitter 100 formed on the substrate 50; a ¼ wave plate 110; and a reflective mirror 120.

The substrate 50 is a LN substrate of Z-cut formed of lithium niobate ($LiNbO_3$: LN), for example. Therefore, to the polarization multiplexing modulator according to the present embodiment, the light of TM mode in excellent modulation efficiency is input. Further, it is also possible to use a LT substrate formed of lithium tantalate ($LiTaO_3$: LT) in place of the LN substrate. Furthermore, a substrate of X-cut may be used in place of the substrate of Z-cut. In the case where the substrate of X-cut is used, the light of TE mode is input to the polarization multiplexing modulator.

The demultiplexer 60 demultiplexes the light input from the input section IN into two lights, to supply them to the first optical modulator 70 and the second optical modulator 80, and may be configured as a waveguide type one-input and two-outputs coupler (1×2 coupler).

The first and second optical modulators 70 and 80 have the substantially same configuration, and are arranged in parallel with each other on the substrate 50. Although the detailed description is omitted here, each of the first and second optical modulators 70 and 80 includes: an input waveguide; a pair of branched waveguides branched from the input waveguide; an output waveguide to which the pair of branched waveguides joins; a signal electrode; and an earth electrode. Thus, each of the first and second optical modulators 70 and 80 is capable of outputting an intensity modulated light or a phase modulated light when a microwave electric signal is applied to the signal electrode. Here, the output waveguide of the first optical modulator 70 is connected to a curved waveguide 51 formed in an arc shape for turning back the propagation direction of the light, and on the substrate 50, a groove 52 in an arc shape is formed along an outer peripheral side of the curved waveguide 51. A loss of a light being propagated through the curved waveguide 51 is suppressed by the arc shaped groove 52.

The first polarization beam splitter 90 which is capable of separating the input light into the light of TE mode and the light of TM mode to output the separated lights, and also, when the light of TE mode and the light of TM mode are input, is capable of polarization combining these lights to output the multiplexed light, includes four input/output ports of first port 90a to fourth port 90d. In the present embodiment, when the light of TM mode is input from the first port 90a, the first polarization beam splitter 90 outputs it as it is from the third port 90c. On the other hand, when the lights in different polarization sates are input from the third port 90c and the fourth port 90d, the first polarization beam splitter 90 polarization combines the input lights while holding the polarization states thereof, to output the multiplexed light from the second port 90b. Further, the first port 90a of the first polarization beam splitter 90 is connected to the output waveguide of the second optical modulator 80, the second port 90b thereof is connected to an output waveguide 53 which extends to the output section OUT, of the polarization multiplexing modulating device, the third port 90c thereof is connected to a first port 100a of the second polarization beam splitter 100 via a connection waveguide 54, and the fourth port 90*d* thereof is connected to the output waveguide of the first optical modulator 70 via the curved waveguide 51.

Figure 5:
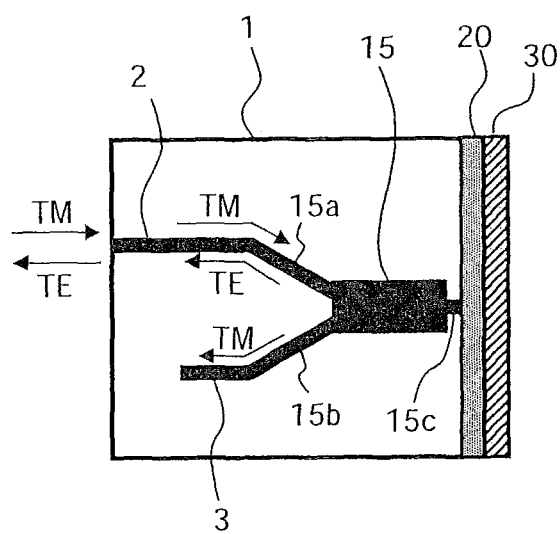
FIG. 5 is a view illustrating a modified example of the polarization conversion device according to the third embodiment.

The second polarization beam splitter 100 has in the same configuration as that of the polarization beam splitter 15 illustrated in FIG. 5, and includes three input/output ports of first port 100*a* to third port 100*c*. In this embodiment, when the light of TM mode is input from the first port 100*a*, the second polarization beam splitter 100 outputs it as it is from the third port 100*c*. On the other hand, when the light containing the light of TE mode and the light of TM mode is input from the third port 100*c*, the second polarization beam splitter 100 outputs the light of TE mode from the first port 100*a* while outputting the light of TM mode from the second port 100*b*. Then, the first port 100*a* of the second polarization beam splitter 100, as described above, is connected to the third port 90*c* of the first polarization beam splitter 90 via the connection waveguide 54, and the second port 100*b* thereof is connected to a fourth waveguide 55 formed in approximately parallel with the connection waveguide 54. Further, the third port 100*c* of the second polarization beam splitter 100 is exposed to an end face of the substrate 50 on the opposite side of the connection waveguide 54 and the fourth waveguide 55 with the second polarization beam splitter 100 therebetween.

The ¼ wave plate 110 and the reflective mirror 120 are attached, in this sequence, on the end face of the substrate 50 to which the third port 100*c* of the second polarization beam splitter 100 is exposed. As a result, the light output from the third port 100*c* of the second polarization beam splitter 100 passes through the ¼ wave plate, and is reflected by the reflective mirror 120, and then, again passes through the ¼ wave plate 110 to be returned to the third port 100*c*.

Incidentally, the connection waveguide 54 and the fourth waveguide 55 in the present embodiment correspond to the first waveguide 2 and the second waveguide 3 in each of the first to third embodiments, respectively.

Next, there will be explained a function of the polarization multiplexing modulator according to the present embodiment.

As described in the above, since the polarization multiplexing modulator according to the present embodiment adopts the LN substrate of Z-cut, the light of TM mode is input from the input section IN. The input light of TM mode is demultiplexed into two lights by the demultiplexer 60, and the demultiplexed lights are input to the first and second optical modulators 70 and 80. The first and second optical modulators 70 and 80 intensity modulate or phase modulate the input lights of TM mode, respectively, to output the intensity modulated or phase modulated lights from the output waveguides.

The light of TM mode output from the second optical modulator 80 passes through the first and third ports 90*a* and 90*c* of the first polarization beam splitter 90, the connection waveguide 54, and the first port 100*a* of the second polarization beam splitter 100, to be output as it is from the third port 100*c* of the second polarization beam splitter 100. The light of TM mode output from the third port 100*c* of the second polarization beam splitter 100 passes through the ¼ wave plate 110, and thereafter, is reflected by the reflective mirror 120 to again pass through the ¼ wave plate 110, and is returned to the third port 100*c* of the second beam splitter 100. The returned light has passed through the ¼ wave plate 110 twice, and has been converted into the light of TE mode, since the polarization plane thereof has been rotated by 90°. At this time, there may be generated a component which has not been mode-converted due to deviation in a setting angle of the ¼ wave plate 110 or of the reflective mirror 120, a characteristic change of the ¼ wave plate 110 caused by a temperature change or the like, and accordingly, the light containing the light of TE mode and the light of TM mode may be input to the third port 100*c* of the second polarization beam splitter 100. Even in the case where the light containing the light of TE mode and the light of TM mode is input to the third port 100*c*, the second polarization beam splitter 100 separates the input light into the light of TE mode and the light of TM mode, to output the light of TE mode from the first port 100*c* to thereby lead it to the connection waveguide 54, while outputting the light of TM mode from the second port 100*b* to thereby diffuse it in the substrate 50 via the fourth waveguide 55. Since the light of TM mode diffused in the substrate 50 via the fourth waveguide 55 is not substantially coupled to the connection waveguide 54, the light of TE mode is input (returned) to the third port 90*c* of the first polarization beam splitter 90 via the connection waveguide 54.

On the other hand, the light of TM mode output from the first optical modulator 70 is input to the fourth port 90*d* of the first polarization beam splitter 90 via the curved waveguide 51. Here, the lengths of the respective waveguides inclusive of the curved waveguide 51 and the connection waveguide 54 are regulated so that a period of time until the light of TM mode output from the first optical modulator 70 is input to the fourth port 90*d* of the first polarization beam splitter 90 is coincident with a period of time until the light of TM mode output from the second optical modulator 80 is converted into the light of TE mode to be input to the third port 90*c* of the first polarization beam splitter 90. As a result, to the third port 90*c* of the first polarization beam splitter 90 and to the fourth port 90*d* thereof, the light of TE mode and the light of TM mode are input at approximately same timing.

Further, the first polarization beam splitter 90 polarization combines the light of TE mode input to the third port 90*c* and the light of TM mode input to the fourth port 90*d* while holding respective polarization states thereof, to generate a polarization multiplexed light, and output it from the second port 90*b*. The polarization multiplexed light output from the second port 90*b* of the first polarization beam splitter 90 is output from the output section OUT via the output waveguide 53.

According to the polarization multiplexing modulator in the present embodiment, the input light is demultiplexed into two lights and the respective demultiplexed lights are intensity modulated or phase modulated by the first optical modulator 70 and the second optical modulator 80, and also, the output light from the second optical modulator 80 is mode-converted, and then, the output light from the first optical modulator 70 and the mode-converted output light from the second optical modulator 80 are polarization combined while holding polarization directions thereof to generate the polarization multiplexed light, and then, the polarization multiplexed light is output. Here, to the first polarization beam splitter 90 which performs the polarization combining, the output light from the first optical modulator 70 and the mode-converted output light from the second optical modulator 80 are input at approximately same timing. Further, for the output light from the second optical modulator 80, only the mode-converted light is input to the first polarization beam splitter 90. As a result, it is possible to generate the polarization multiplexed light in stable and output it.

In the present embodiment, the second polarization beam splitter 100, the ¼ wave plate 110 and the reflective mirror 120 correspond to "the polarization convertor" in the present invention, and the first polarization beam splitter 90 corresponds to "the polarization combiner" therein. Further, the ¼ wave plate 110 and the reflective mirror 120 correspond to "the mode convertor" in the present invention, and the second polarization beam splitter 100 corresponds to the "polarization separator" therein.

Incidentally, in the embodiment of the polarization multiplexing modulator described above, as the configuration for converting the polarization state of the output light from the second optical modulator 80, the configuration corresponding to the polarization conversion device illustrated in FIG. 5 is applied. In place of this configuration, it is also possible to apply the configuration corresponding to the polarization conversion device illustrated in FIG. 1, FIG. 3 or FIG. 4. Further, in the present embodiment, the light of TM mode is input to each of the first optical modulator 70 and the second optical modulator 80, and, it is also possible to input the light of TE mode by adopting the substrate of X-cut.

According to the above-mentioned polarization conversion device, in the reflective type configuration in which the input section and the output section are common, even in the case where there is generated the component which has not been TE/TM mode converted by the mode convertor, the light of which TE/TM mode has been converted by the polarization separator is output, and therefore, it is possible to suppress the degradation in the polarization extinction ratio of the output light depending on variations in parts or in temperature.

Further, according to the above-mentioned polarization multiplexing modulator, in the configuration in which the output light from the first optical modulator and the output light from the polarization convertor that polarization-converts the output light from the second optical modulator, are polarization combined, so that the polarization multiplexed light is generated to be output, the output light from the polarization convertor can be suppressed from containing the light which has not been polarization-converted, and accordingly, the polarization multiplexed light can be generated in stable to be output.

All examples and conditional language recited herein are intended for pedagogical purposes to aid the reader in understanding the principles of the invention and the concepts contributed by the inventor for furthering the art, and are to be construed as being without limitation to such specifically recited examples and conditions, nor does the organization of such examples in the specification relate to a showing of the superiority and inferiority of the invention. Although the embodiments of this invention have been described in detail, it should be understood that the various changes, substitutions, and alterations could be made hereto without departing from the spirit and scope of the invention.

What is claimed is:

1. A polarization multiplexing modulator comprising:
a substrate having an electro-optic effect;
a first optical modulator and a second optical modulator which are provided on the substrate and which modulate respective lights of same polarization state;
a polarization converter which converts a polarization state of an output light from the second optical modulator; and
a polarization combiner which polarization combines an output light from the first optical modulator and an output light from the polarization converter, to generate and output a polarization multiplexed light and output it,
wherein the polarization converter includes:
a mode converter which performs TE to TM mode conversion or TM to TE mode conversion of the output light from the second optical modulator; and
a polarization separator which receives a light passed through the mode converter and separates the received light into a first light, a TE/TM mode of which has been converted by the mode converter, and a second light, a TE/TM mode of which has not been converted by the mode converter, to output the first light to the polarization combiner,
wherein the polarization converter is configured that the output light from the second optical modulator passes through the polarization separator to be input as is to the mode converter, and the light output from the mode converter is input to the polarization separator; and
the polarization separator separates the light output from the mode converter and received by the polarization separator, into first and second light components, the first light component having a mode different from the output light from the second optical modulator and the second light component having a mode same as the output light from the second optical modulator, and outputs the first light component to the polarization combiner and outputs the second light component into the substrate to diffuse the second light component in the substrate.

2. A polarization multiplexing modulator according to claim 1, further comprising;
a demultiplexer which is provided on the substrate and which demultiplexes a light input thereto into two, to supply the demultiplexed lights to the first optical modulator and the second optical modulator.

* * * * *